Sept. 9, 1958    C. L. PFEIFFER    2,851,579
RESISTANCE HEATED SOLDER POT
Filed April 4, 1955
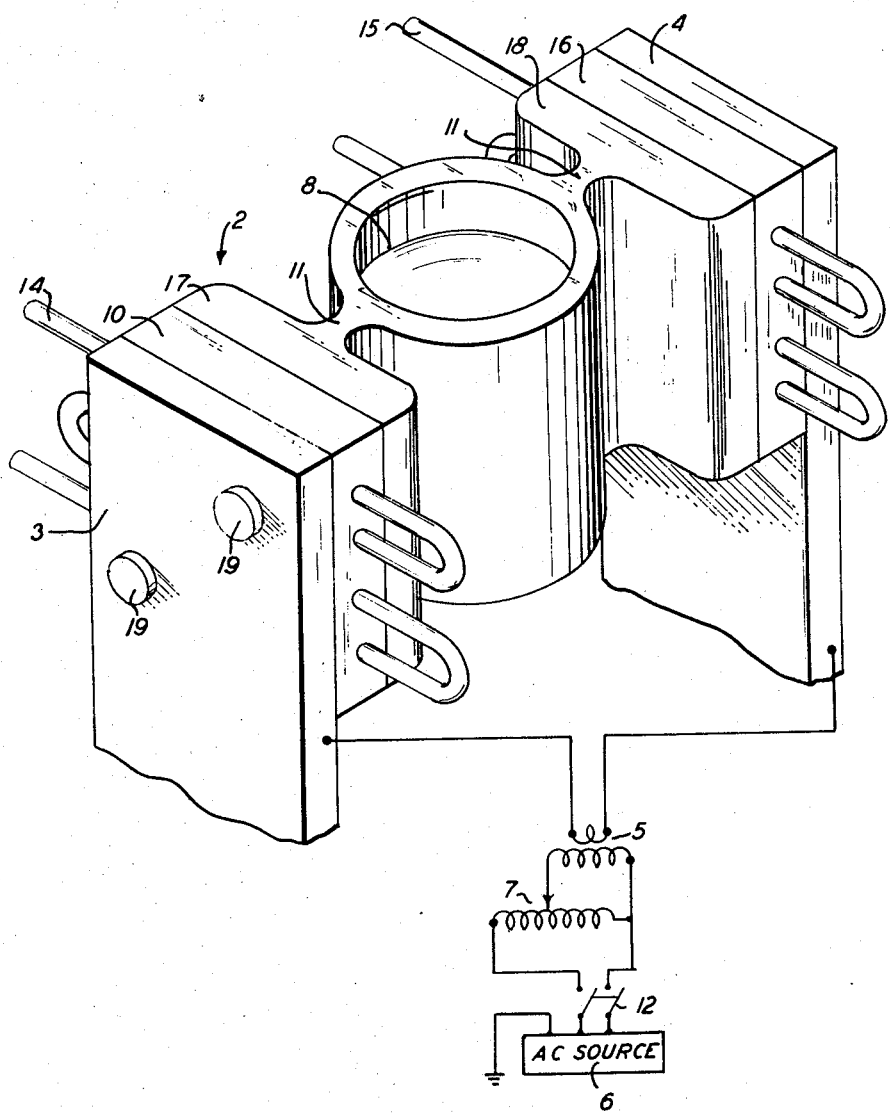
INVENTOR
C. L. PFEIFFER
BY
ATTORNEY United States Patent Office 2,851,579
Patented Sept. 9, 1958

2,851,579

RESISTANCE HEATED SOLDER POT

Conrad L. Pfeiffer, Chicago, Ill., assignor to Western Electric Company, Incorporated, New York, N. Y., a corporation of New York Application April 4, 1955, Serial No. 498,993

1 Claim. (Cl. 219—44)

This invention relates to a resistance heated solder pot and it is the object of this invention to provide an improved, ruggedly constructed, quick heating solder pot.

According to the general features of the invention, a solder well in a conductive member is heated directly by passing a large current through the material of the solder well itself, portions of the member immediately adjacent and on each side of the well being of small cross-sectional areas to offer relatively high resistance to the current resulting in the resistance heating of the portions to high temperatures and conductively heating the solder well therebetween. Thermal barriers of relatively large cross-sectional areas and having means for passing coolant fluid therethrough are utilized at each end of the member for contacting a pair of low potential terminals of an energizing source and protect the source from damage by overheating.

These and other features of the invention will be more fully understood from the following detailed description taken in conjunction with the single figure of the accompanying drawing which discloses a solder pot constructed in accordance with the teachings of the invention and a schematic diagram of an electrical supply circuit therefor.

In the drawing an electrically conductive member 2, which may be carbon, cast iron, nickel-chromium alloy or any conductive material of suitable resistivity which can withstand high temperatures, is bridged across two large conductor bars or end portions 3 and 4 of a secondary, low voltage winding of a welding type transformer 5. The transformer energized from a suitable source 6 through a variable auto-transformer 7 which may be used to regulate the temperature of the solder pot by controlling the current in member 2.

A thin-walled solder well 8 in the mid-portion of member 2 is connected to protective thermal barrier elements 10 and 16 on either side of the well through heat generating portions 11 of relatively small cross-sectional areas. Due to the concentration of the current density through portions 11, extremely high temperatures will be generated in these portions to conductively heat the thin-walled solder well. The ends 17 and 18 of the conductive member 2, which have relatively large cross-sectional areas and correspondingly reduced current densities, are connected to their respective heat dissipating elements 10 and 16 and transformer conductor bars 3 and 4 by bolts 19 which screw into the ends. Heat conductively applied to the barrier elements 10 and 16 from member 2 is dissipated by coolant fluid which is circulated through coils 14 and 15 respectively in the elements. The coolant supply and its circulating means are not shown in the drawing as they may be of conventional design. Elements 10 and 16 may be made of any metal having a high melting point and good heat and electrical conductivity properties such as, for example, copper. If the solder pot itself is made of such a metal, separate elements are not required and the coils 14 and 15 or other cooling passages may be provided in the large cross-sectional end portions. The proportioning of the member 2 is not critical and depends on the metal used, the desired operating temperature and the size of the solder well.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

In a resistance heated solder pot, a conductive member having a mid-portion with a solder well therein, heat generating portions of relatively small cross-sectional areas adjacent opposite sides of the mid-portion, the resistivity of the conductive member being such that high heat intensities are generated in the relatively small cross-sectional areas when current is passed through the member, thermal barrier elements of relatively high electrical and thermal conductivity as compared with said member connected to the ends of the member, means for connecting the elements across the source of operating potential to produce an electrical current in the member, and end portions on the member, having relatively large cross-sectional areas as compared to the heat generating portions, separating each thermal barrier element and the respective heat generating portions, said end portions being of such length to produce a sufficiently low thermal gradient between the heat generating portions and the thermal barrier elements to allow a substantial amount of the heat generated in the heat generating portions to be transferred to the solder well.

References Cited in the file of this patent

UNITED STATES PATENTS 2,665,229   Schuler _____ Jan. 5, 1954